United States Patent [19]
Tremel et al.

[11] Patent Number: 5,491,697
[45] Date of Patent: Feb. 13, 1996

[54] METHOD AND DEVICE FOR MEASUREMENT OF PERFORMANCE PARAMETERS OF AN ASYNCHRONOUS TRANSFER MODE TRANSMISSION NETWORK

[75] Inventors: Jean-Yves Tremel; René Garandel, both of Pleumeur Bodou; Yves Jan, Rospez, all of France

[73] Assignee: France Telecom, Paris, France

[21] Appl. No.: 191,399

[22] Filed: Feb. 3, 1994

[30] Foreign Application Priority Data

Feb. 16, 1993 [FR] France ................................ 93 01736

[51] Int. Cl.⁶ .............................................. G06F 11/00
[52] U.S. Cl. ..................... 371/5.1; 364/514 R; 364/550; 371/20.1; 371/22.1
[58] Field of Search .................................. 364/514, 550; 370/15, 17; 371/5.1, 20.1, 29.1

[56] References Cited

U.S. PATENT DOCUMENTS

| | | | |
|---|---|---|---|
| 1,913,496 | 6/1933 | Matte | 370/17 |
| 3,036,290 | 5/1962 | Zarouni | 371/5.1 X |
| 4,059,729 | 11/1977 | Eddy et al. | 370/15 |
| 4,684,980 | 8/1987 | Rast et al. | 348/7 |
| 4,729,126 | 3/1988 | Olek | 379/22 |
| 4,769,761 | 9/1988 | Downes et al. | 364/514 |
| 4,821,267 | 4/1989 | Druegh et al. | 371/20.1 |

FOREIGN PATENT DOCUMENTS

| | | |
|---|---|---|
| 0456914 | 11/1991 | European Pat. Off. . |
| 0477553 | 4/1992 | European Pat. Off. . |
| 0520580 | 12/1992 | European Pat. Off. . |

OTHER PUBLICATIONS

T. Migotti et al., Performance Evaluation of Broadband Connections and Services Under Varying Traffic Loads, *Electronics & Communication Engineering Journal,* vol. 4, No. 4, Aug. 1992, pp. 243–251.

*Primary Examiner*—Edward R. Cosimano
*Attorney, Agent, or Firm*—Nilles & Nilles

[57] ABSTRACT

A method for the measurement of performance parameters of an asynchronous transfer mode transmission network having an asynchronous transfer mode channel, the method including: generating identifiable measurement cells and inserting the identifiable measurement cells into an asynchronous incident flow transmitted by the asynchronous transfer mode channel; receiving an asynchronous flow of cells from the channel, counting a total number of cells received in the asynchronous flow, detecting the identifiable measurement cells among the asynchronous flow and counting a total number of identifiable measurement cells received in the asynchronous flow, comparing a content of each individual identifiable measurement cell with an expected content for that individual identifiable measurement cell so as to detect transmission errors, generating and memorizing a counting information element upon each reception of a given number of cells in the asynchronous flow, the counting information element comprising the total number of cells received in the asynchronous flow, and generating and memorizing an information element upon the reception whenever the content of each individual identifiable measurement cell does not correspond to the expected content for that individual identifiable measurement cell, the information element comprising the total number of cells received in the asynchronous flow, the total number of identifiable measurement cells received in the asynchronous flow, the content of that individual identifiable measurement cell and a number of errors declared.

20 Claims, 2 Drawing Sheets

METHOD AND DEVICE FOR MEASUREMENT OF PERFORMANCE PARAMETERS OF AN ASYNCHRONOUS TRANSFER MODE TRANSMISSION NETWORK

BACKGROUND OF THE INVENTION

The invention relates to a method for the measurement of performance parameters of an ATM network and to a device for the implementation of the method.

It will be recalled that an ATM (Asynchronous Transfer Mode) network enables the transmission of digital information at bit rates that could be very high. Indeed these bit rates could go up to 155 Mbits/s.

Transmission according to the ATM standard is done by the transfer of information blocks of constant length. The elementary quantity of information transmitted is 48 bytes. The block transmitted in ATM is called a cell and is identified by a 5-byte label called a header. The total length of a cell is therefore 53 bytes.

There is no system today that enables the measurement of the performance parameters of such a network and that, in particular, provides knowledge of the rate of erroneous cells, the rate of inserted cells and the rate of lost cells.

SUMMARY OF THE INVENTION

The present invention is aimed at overcoming this problem. An object of the present invention is a method for the measurement of performance parameters of an ATM type transmission network mainly comprising the following steps:

generating identifiable measurement cells and inserting them into an incident flow transmitted by an ATM channel;

receiving the flow of cells from the ATM channel;

counting the cells received;

detecting the measurement cells among the cells of the flow and counting them;

comparing the content of the identified measurement cells with the expected content to detect transmission errors;

generating and memorizing a counting information element at each reception of a given number of cells, this information element comprising the total number of cells received and the number of measurement cells received, generating and memorizing an information element on the reception whenever the content of a measurement cell received does not correspond to the expected content, the information element comprising, in addition to the total number of cells received and the number of measurement cells received, the content of the measurement cells and the number of errors declared.

According to another characteristic of the method, the information elements generated and memorized are data elements comprising four fields: a first field X1 for the total number of cells received at the instant when the data element is memorized, a second field X2 for the number of measurement cells received, a third field X3 for the content of the measurement cell received at this instant, and a fourth field X4 for the number of errors declared in the content of the measurement cell, this last-named field having a value of zero whenever the data element memorized corresponds to a counting information element. During the recording of a counting information element, the fields X2 and X3 respectively contain the order number of the last cell received and the content of the measurement cell received at this instant.

According to another characteristic, the method consists, at transmission, in generating measurement cells containing a header and a transmission order number.

Thus, in the second field, an information element comprises the expected order number and, in the third field, it comprises the received order number.

According to another characteristic, the method consists, at reception, in identifying the measurement cells by the comparison of the header of the cells received with the predetermined, previously recorded header and, when a measurement cell has been identified, in comparing its order number with the expected order number.

The expected order number is obtained by the incrementation, by one order number unit, of the preceding measurement cell even if this number is not in the normal order number of arrival.

According to another characteristic, the method consists, when the order number of a cell and the expected order number are different, in carrying out a real-time comparison between the second and third fields recorded for the current cell and the preceding cell and in declaring the current cell to be erroneous or not erroneous on the basis of the results of the comparison.

The invention also relates to a device for the measurement of performance parameters of an ATM network comprising means for the transmission of a flow of cells having a format and a bit rate corresponding to the transmission standards of the network and means for the reception of the transmitted flow of cells, wherein chiefly:

A) the transmission means comprise:
means for the generation of measurement cells,
means for the insertion of these cells into the incident flow, B) the reception means comprise:
means for the counting of the received cells,
means for the detection and counting of the measurement cells,
means to compare the content of the identified measurement cells with the expected content to detect transmission errors,
means to memorize a counting information element or reception information element, the reception information elements being a function of the number of cells received and of the number of errors in the measurement cell concerned,
means for the processing of the information elements to obtain a dating of the cells and the transmission error rate.

According to another characteristic, the means for the generation of measurement cells comprise:

a header generator that can be used to identify the measurement cells;

a generator of the information field of the measurement cells that can be used to generate an order number;

a multiplexer receiving each header generated and each order number.

According to another characteristic, the header generator comprises a programmable memory in which one or more predetermined headers are recorded and activation means capable of activating the reading, in the memory, of a given header for the duration of the measurement.

According to another characteristic, the generator of the information field of the measurement cells comprises an N1 bit counter which, at each incrementation, makes it possible to give an order number of the generated cell, this number constituting the information field of the cell.

According to another characteristic, the means for the counting of received cells comprise an N2 bit counter, activated by a cell clock signal HC given by the received flow of cells.

According to another characteristic, the means for the counting of measurement cells comprise an N3 bit counter, activated by a measurement cell clock signal HM given by the measurement cell detection means.

According to another characteristic, the comparison means comprise an N1 bit adder register and an N1 bit comparator.

According to another characteristic, the memorizing means comprise a dual-access memory in which there are memorized the counting and reception data elements in order to enable the processing means to write and read these data elements at the same time in the memory.

According to another characteristic, the processing means comprise a central processing unit that is capable of determining the rate of erroneous cells, the rate of inserted cells and the rate of lost cells, and is capable of dating the cells on the basis of the memorized data elements.

According to another characteristic, the processing means furthermore comprise means for the storage of data elements that have been memorized in real time in order to carry out these processing operations in deferred time.

BRIEF DESCRIPTION OF THE DRAWINGS

Other particular features and advantages of the invention shall appear from the following description, given by way of an indication that in no way restricts the scope of the invention, and from the appended drawings, in which.

MORE DETAILED DESCRIPTION

The flow of data elements transmitted according to the ATM format takes the form of digital information cells with a length of 53 bytes, the transmission taking place in asynchronous mode.

Naturally, the invention can be applied also to any transmission of this type.

Transmission errors in ATM mode result in the appearance of defects of the following type: erroneous cells, lost cells or cell insertions.

An erroneous cell is a cell whose received content does not correspond to the transmitted content.

A lost cell is a transmitted cell that does not reach the addressee receiver terminal.

An inserted cell is a cell whose destination was not the terminal which receives it.

According to the method for the measurement of performance parameters which is the object of the invention, it is possible to obtain the transmission error rate after measurements made over several hours of transmission and even over several days. Indeed, the measurement is used to determine the number of erroneous cells observed during the measurement, the number of cells lost as well as the number of cells inserted.

According to the method, cells known as "measurement" cells are generated. These are cells whose content makes it possible, firstly, to identify them at reception and, secondly, to know the order in which they have been transmitted.

Figure 1:
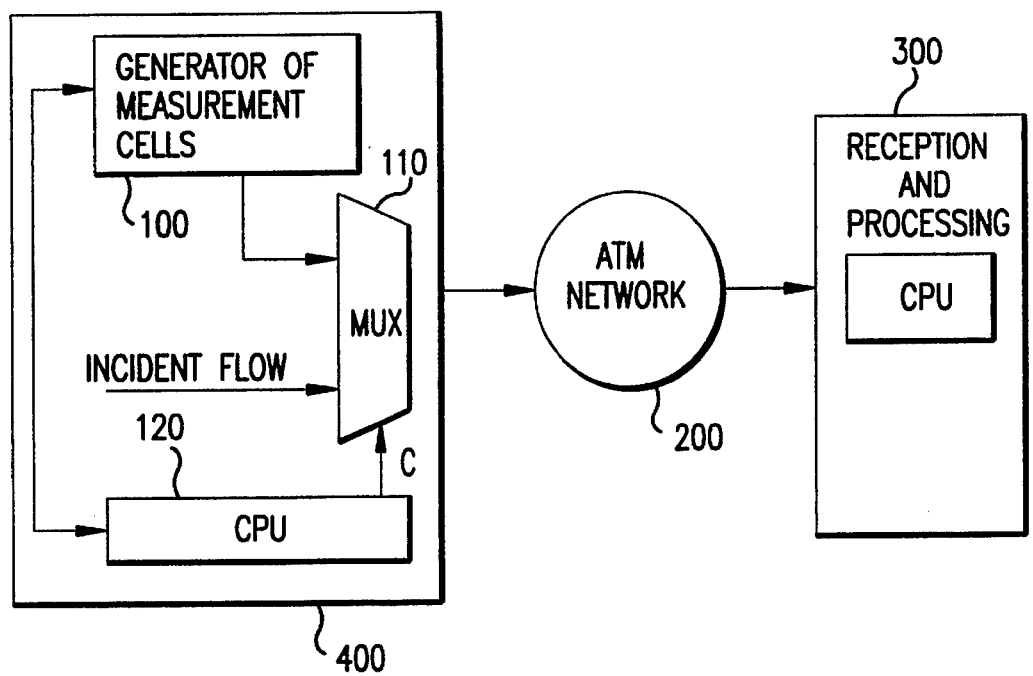
FIG. 1 is a drawing that shows the principle of the invention.

Thus, as can be seen in FIG. 1, there is provision for a generator 100 capable of generating measurement cells to transmit them on an ATM network 200 to a receiver terminal 300.

Before being transmitted on the network, the measurement cells are inserted into an incident flow sent towards the receiver terminal, this flow being obtained by a transmitter terminal 400 which is known per se for the incident flow generation part. The insertion is obtained by means of a multiplexer 110 which delivers a multiplexed signal at the desired rate given by a command C provided by the transmitter terminal on the basis of its central processing unit 120.

Figure 2:
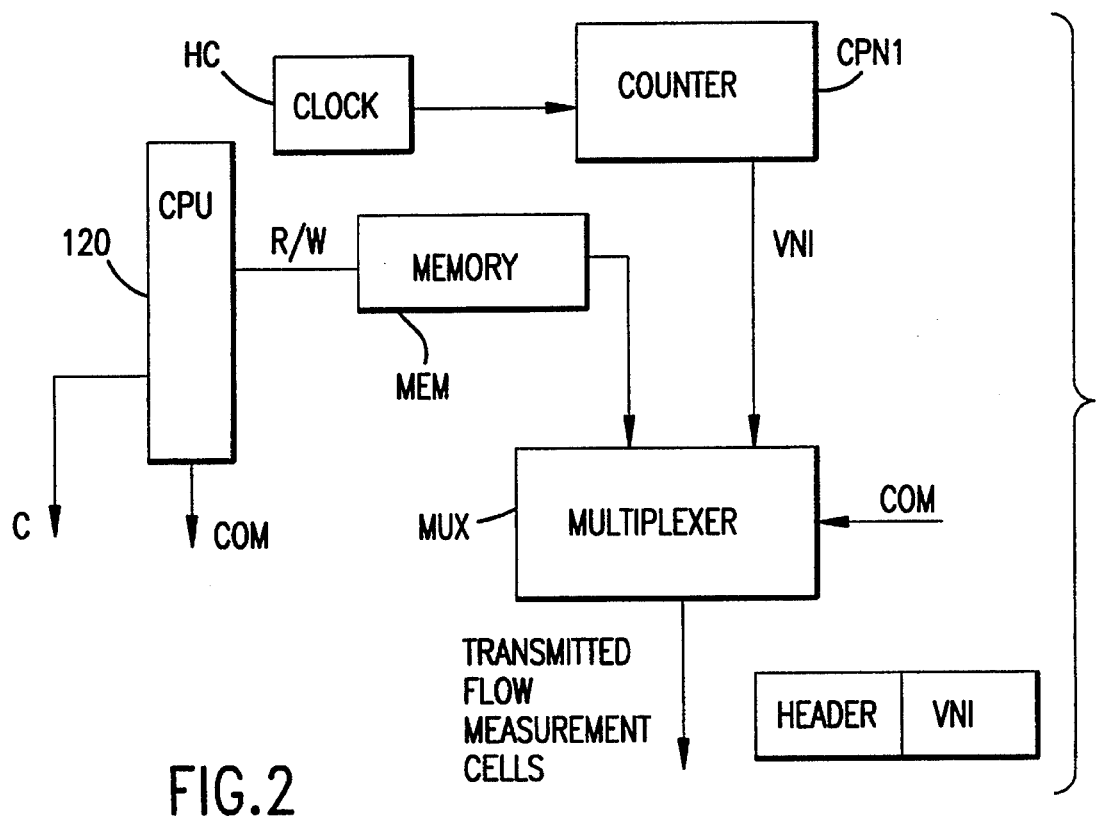
FIG. 2 is a drawing that shows the embodiment of the transmission means according to the invention.

FIG. 2 is used to illustrate a practical embodiment of the measurement cells generator.

The generator comprises a control unit CPU controlling the operations for reading and writing (R/W) data in a RAM type programmable memory MEM. This control unit generates a control signal COM. The memory contains 5-byte data elements corresponding to different headers. A header is chosen for the entire duration of a measurement. A header can be changed to carry out other series of measurements.

The generator furthermore comprises a counter CPN1 activated by a clock HC. This counter delivers counting values VN1 at the rate of the clock HC. These counting values are N1 bit data elements repeated (48×8)/N1 times. The sending rate is chosen by the user who, by means of a keyboard (not shown) of the transmitter terminal, will control the generation of the signal C by the processing unit.

The signal COM, given by the unit 120, makes it possible to demarcate the header from the information field of the cell and, hence, to control the output of a multiplexer MUX to obtain the flow of measurement cells. This flow is formed by measurement cells comprising a header read in the memory MEM and an information field containing a counting value VN1, that gets incremented by one unit at each cell. Thus, the cells generated are identifiable by their headers and their information field contains a transmission order number.

Figure 3:
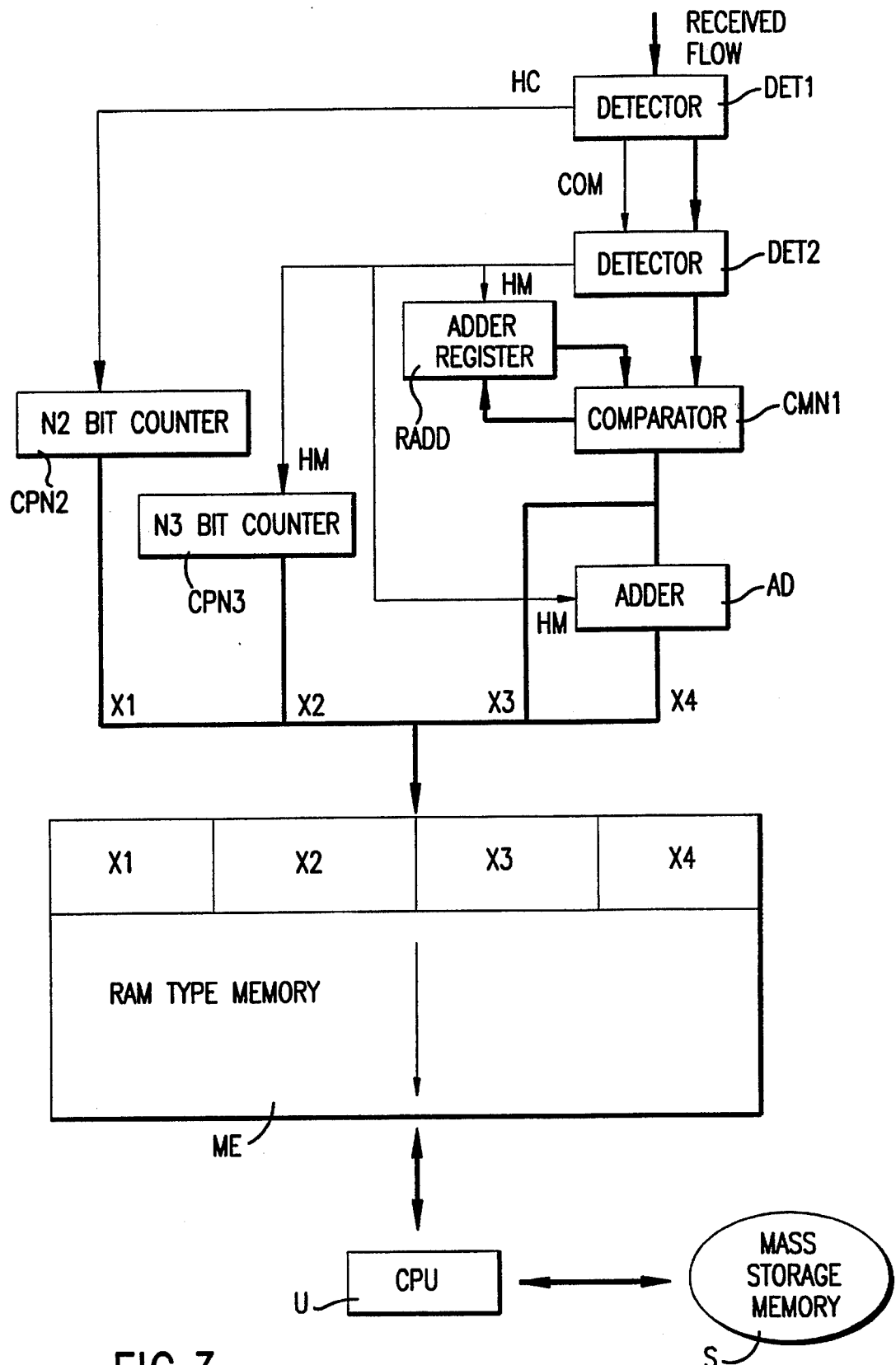
FIG. 3 is a drawing that shows the embodiment of the reception and processing means according to the invention.

FIG. 3 shows an exemplary embodiment of the reception and processing means that can be used to implement the method according to the invention. Only these means are shown, the other elements of the receiver terminals being standard per se. The detector DET1 of cells of the flow received enables the generation of a signal COM that is synchronous with the arrival of the headers of the cells. This signal is applied to a second detector that enables the identification, from among the cells received, of those cells that are measurement cells.

To this end, the detector compares the header of the cells received with the identification header of a measurement cell. To this end, the detector has a comparator and a register (not shown). The register contains the identification header chosen at transmission for the measurement.

The detection of the measurement cells by the detector DET2 makes it possible to obtain a measurement cells clock signal HM. The information field of the measurement cells is applied to an N1 bit comparator CMN1 that carries out a comparison between the information field received and the expected field. The information field is given by an adder register RADD. This register receives, for this purpose, a loading value given by the comparator CMN1. This value is the last value received by the comparator, whether or not the value is an erroneous one. The expected value therefore corresponds to this last value loaded into the register incremented by 1.

The field of information of the measurement cells, namely the 48 bytes, are compared with the 48 bytes given by the register. When there are differences, the number of errors obtained on the current cell is added up to find out the total number of errors of bits on each cell. The number obtained by the adder is controlled by the clock HM.

There are also cell counters available. Indeed, an N2 bit counter CPN2 enables the counting of the number of cells received from the clock HC. An N3 bit counter CPN3 enables the counting of the number of measurement cells received from the clock HM.

A data element formed by four fields X1, X2, X3 and X4 is formed with the outputs of these counters CNP2, CNP3, the output of the comparator CMN1 and the output of the adder AD.

When this data element is being formed in order to memorize it, the field X1 comprises the count value of the counter CPN2, namely the number of cells received.

The field X2 comprises the count value of the counter CPN3, namely the number of measurement cells received.

The field X3 comprises (Y×N1) data bits contained in the information field of the measurement cell received.

The field X4 comprises the number of errors counted in the information field of the measuring cell received. According to the method, the data elements thus obtained are memorized in real time in a RAM type memory ME. Preferably, this memory is mounted so as to provide for dual access in a standard way, thus enabling simultaneous reading and writing operations in order to carry out real-time processing operations on the data elements. A mass-storage memory S may be planned in order to store data elements periodically should the operations of processing and analysis be deferred.

The processing unit is capable of controlling the operations for reading and writing data in the memory ME and/or in the mass-storage memory S.

Counting data elements are written in the memory ME whenever the number of cells received has reached a predetermined value, i.e. in practice 2N2. A counting data element has its field X4 at zero. These data elements can be used to obtain a time base and are used by the processing unit to have a time reference and thus date the cells.

Reception data elements are written in the memory ME whenever there appears a difference between the expected content of a measurement cell and the received content, whether this difference is due to an erroneous cell, a loss of a cell or a cell insertion.

Thus, the comparator CMN1 compares the values of N1 bits coming from the information field of the received measurement cell with the value of N1 bits coming from the adder register RADD.

This adder register contains the value of N1 bits of the preceding cell incremented by 1. This value is normally the expected value.

The result of each comparison is transferred to the adder.

The N1 bits of the information field of the measurement cell are automatically loaded into the register for the testing of the next cell received.

The number of errors in the cell is obtained at the end of (48×8)/N1 comparisons.

If the number of errors is different from zero, then a reception data element is written in the dual-access memory:

Value of the counter CPN2 of cells on N2 bits;

Value of the counter CPN3 of measurement cells on N3 bits;

Value of the last Y values of the order number of N1 bits contained in the information field of the cell received;

Value of the number of errors of the current cell on N3 bits.

This writing operation also takes place in the event of an overflow of the counter CPN2, and the data element written in this case indicates the state of the last cell received.

The memory ME is a circular memory that is managed in dual-access mode comprising, as stated already, a register that is accessible in reading mode by the unit U enabling the retrieval of the value of the memory address. The unit U can read the data elements and process them in real time in order to deduce the performance parameters therefrom. It saves them after compression, if necessary, in the mass-storage memory S. These data elements can then be processed in deferred time.

The content of the field X4 gives the state of the current cell. The order number of the cell received is obtained by means of the field X3. The field X4 indicates whether this cell is erroneous. The history of the preceding cell and that of the next cell makes it possible to decide whether this cell is erroneous or inserted or if there are any lost cells. The exact dating of this event is obtained by means of the absolute counter of cells that is associated with the field X1.

Let us consider a current cell B with the fields named field X1B, field X2B, field X3B and field X4B.

Let us consider the preceding cell with the fields named field X1A, field X2A, field X3A and field X4A.

Let us consider the folllowing cell with the fields named field X1C, field X2C, field X3C and field X4C.

The state of the field X4 is known. If this field is at zero, there is no processing to be done. Otherwise the following processing is implemented:

The order number of the current cell is known by means of the field X3B.

The order number of the measurement cell received earlier is obtained from the field X2A, the field X3A and the field X2B by a majority vote.

The order number of the next measurement cell is obtained by means of the field X2C, the field X3C and the field X2B.

The fields X1A, X1B and X1C make it possible to ascertain the relative position of the cells in time and hence to date them.

The knowledge of the history of the flow of cells is used to find out how many cells are erroneous or inserted or lost. These events are dated with the precision of the cell time reference. It is thus possible to know the number of cells during a determined period of time.

The number of erroneous, inserted and lost cells is obtained modulo N1.

The number of errors in the information field of the cell is obtained modulo N4.

What is claimed is:

1. A method for measurement of performance parameters of an asynchronous transfer mode transmission network having an asynchronous transfer mode channel, said method comprising:

generating identifiable measurement cells and inserting the identifiable measurement cells into an asynchronous incident flow transmitted by the asynchronous transfer mode channel, receiving an asynchronous flow of cells from the asynchronous transfer mode channel, counting a total number of cells received in the asynchronous flow of cells, detecting the identifiable measurement cells among the asynchronous flow of cells and counting a total number of identifiable measurement cells received in the asynchronous flow of cells, comparing a content of each individual identifiable measurement cell with an expected content for that individual identifiable measurement cell so as to detect transmission errors, generating and memorizing a counting information element upon each reception of a given number of cells in the asynchronous flow of cells, the counting information element comprising the total number of cells received in the asynchronous flow of cells, and generating and memorizing an information element upon the reception whenever the content of each individual identifiable measurement cell does not correspond to the expected content for that individual identifiable measurement cell, the information element comprising the total number of cells received in the asynchronous flow of cells, the total number of identifiable measurement cells received in the asynchronous flow of cells, the content of that individual identifiable measurement cell and a number of errors declared.

2. A method for measurement of performance parameters of an asynchronous transfer mode transmission network according to claim 1, wherein the information elements are data elements comprising:

a first field for the total number of cells received at an instant when a data element is memorized, a second field for the total number of identifiable measurement cells received at the instant when the data element is memorized, a third field for the content of the individual identifiable measurement cell received most recently before the data element is memorized, and a fourth field for the number of errors declared in the content of the individual identifiable measurement cell, the fourth field having a value of zero whenever the data element memorized corresponds to a counting data element.

3. A method for measurement of performance parameters of an asynchronous transfer mode transmission network according to claim 2, wherein generating identifiable measurement cells includes generating identifiable measurement cells containing a header and a transmission order number.

4. A method for measurement of performance parameters of an asynchronous transfer mode transmission network according to claim 2, further comprising identifying the identifiable measurement cells by comparison of a header of the identifiable measurement cells that are received with a previously recorded header and, when a single identifiable measurement cell has been identified, comparing an order number of the single identifiable measurement cell with an expected order number of the single identifiable measurement cell.

5. A method for measurement of performance parameters of an asynchronous transfer mode transmission network according to claim 4, wherein the expected order number is obtained by incrementation, by one order number unit, of a preceding identifiable measurement cell.

6. A method for measurement of performance parameters of an asynchronous transfer mode transmission network according to claim 5, further comprising, when the order number of the single identifiable measurement cell and the expected order number are different, carrying out a real-time comparison between the second field and third field recorded for both a current information cell and a preceding information cell and declaring the current information cell to be one member selected from the group consisting of erroneous, not erroneous, loss of a cell and insertion of a cell.

7. A device for measurement of performance parameters of an asynchronous transfer mode network comprising:

means for transmission of an asynchronous incident flow of cells having a format and a bit rate corresponding to a transmission standard of the asynchronous transfer mode network; and means for reception of an asynchronous flow of cells that are transmitted by said means for transmission, wherein:

A) the means for transmission comprises:
a counter activated by a clock,
means for the generation of identifiable measurement cells, and
means for the insertion of the identifiable measurement cells into the asynchronous incident flow of cells, and B) the means for reception comprises:
means for counting the asynchronous flow of cells that are received by said means for reception,
means for detection and counting of the identifiable measurement cells,
means to compare a content of the detected identifiable measurement cells with an expected content so as to detect transmission errors,
means to memorize one member selected from the group consisting of a counting information element and a reception information element, the reception information element being a function of the number of cells received by said means for reception and of a number of errors in a single identifiable measurement cell, and
means for processing of the counting information element and the reception information element to obtain a dating of the cells and the transmission error rate.

8. A device for measurement of performance parameters of an asynchronous transfer mode network according to claim 7, wherein the means for counting of received cells comprises an N2 bit counter, activated by a cell clock signal HC that is given by a received asynchronous flow of cells.

9. A device for measurement of performance parameters of an asynchronous transfer mode network according to claim 7, wherein the means for detection and counting of the identifiable measurement cells comprises an N3 bit counter, activated by a measurement cell clock signal HM that is given by the means for detection and counting.

10. A device for measurement of performance parameters of an asynchronous transfer mode network according to claim 7, wherein the means to compare comprises an N1 bit adder register and an N1 bit comparator.

11. A device for measurement of performance parameters of an asynchronous transfer mode network according to claim 7, wherein the means to memorize comprises a dual-access memory.

12. A device for measurement of performance parameters of an asynchronous transfer mode network according to claim 7, wherein the means for processing comprises a central processing unit that is capable of determining the rate of erroneous cells, the rate of inserted cells and the rate of lost cells, and is capable of dating the cells on the basis of the memorized data elements.

13. A device for measurement of performance parameters of an asynchronous transfer mode network according to claim 12, wherein the means for processing further comprises means for the storage of data elements that have been memorized in real time in order to carry out processing operations in deferred time.

14. A device for measurement of performance parameters of an asynchronous transfer mode network according to claim 7, wherein the means for the generation of identifiable measurement cells comprises:

- a header generator that can be used to identify the identifiable measurement cells;
- a generator of information fields for the identifiable measurement cells enabling the generation of an order number;
- a multiplexer receiving each header and each order number.

15. A device for measurement of performance parameters of an asynchronous transfer mode network according to claim 14, wherein the header generator comprises a programmable memory in which at least one header is recorded and activation means capable of activating the reading, in the memory, of a given header for the duration of the measurement.

16. A device for measurement of performance parameters of an asynchronous transfer mode network according to claim 14, wherein the generator of information fields of the identifiable measurement cells comprises an N1 bit counter which, at each incrementation, provides an order number of a generated cell, this number constituting the information field of the cell.

17. A method for measurement of performance parameters of an asynchronous transfer mode transmission network having an asynchronous transfer mode channel, said method comprising:

- generating identifiable measurement cells and inserting the identifiable measurement cells into an asynchronous incident flow of cells transmitted by the asynchronous transfer mode channel;
- receiving an asynchronous flow of cells from the asynchronous transfer mode channel;
- counting a total number of cells received in the asynchronous flow of cells;
- detecting the identifiable measurement cells among the asynchronous flow of cells and counting a total number of identifiable measurement cells received in the asynchronous flow of cells;
- comparing a content of each individual identifiable measurement cell with an expected content for that individual identifiable measurement cell so as to detect transmission errors;
- generating and memorizing a counting data element upon each reception of a given number of cells in the asynchronous flow of cells, the counting data element including the total number of cells received in the asynchronous flow of cells; and
- generating and memorizing a reception data element whenever the content of each individual identifiable measurement cell does not correspond to the expected content for that individual identifiable measurement cell, the reception data element including the total number of cells received in the asynchronous flow of cells, the total number of identifiable measurement cells received in the asynchronous flow of cells, the content of that individual identifiable measurement cell and a number of errors declared.

18. A method for measurement of performance parameters of an asynchronous transfer mode transmission network according to claim 17, further comprising identifying the identifiable measurement cells by comparison of a header of the identifiable measurement cells that are received with a previously recorded header and, when a single identifiable measurement cell has been identified, comparing an order number of the single identifiable measurement cell with an expected order number of the single identifiable measurement cell.

19. A method for measurement of performance parameters of an asynchronous transfer mode transmission network according to claim 18, wherein the expected order number is obtained by incrementation, by one order number unit, of a preceding identifiable measurement cell.

20. A method for measurement of performance parameters of an asynchronous transfer mode transmission network according to claim 19, further comprising, when the order number of the single identifiable measurement cell and the expected order number are different, carrying out a real-time comparison between the second field and third field recorded for both a current recordation element and a preceding recordation data element and declaring the current recordation data element to be one member selected from the group consisting of erroneous, not erroneous, loss of a cell and insertion of a cell.

\* \* \* \* \*